United States Patent [19]

Garmater

[11] Patent Number: 4,770,077
[45] Date of Patent: Sep. 13, 1988

[54] TIRE DEBEADER

[76] Inventor: Robert A. Garmater, 23520 Knouse Rd., Harlan, Ind. 46743

[21] Appl. No.: 77,164

[22] Filed: Jul. 24, 1987

[51] Int. Cl.⁴ .............................................. B26D 7/14
[52] U.S. Cl. ........................................ 83/175; 157/13; 83/176; 83/411 R; 83/923; 82/54
[58] Field of Search ................. 82/46, 54, 56, 58, 101; 157/13; 29/426.4; 241/DIG. 31; 83/175, 176, 925 R, 926 R, 411 R, 923

[56] References Cited

U.S. PATENT DOCUMENTS 1,628,817 2/1925 Wilson et al. ......................... 157/13
4,422,581 12/1983 Chryst ..................................... 82/54

Primary Examiner—Frederick R. Schmidt
Assistant Examiner—Lawrence Cruz
Attorney, Agent, or Firm—Roger M. Rickert

[57] ABSTRACT

A device for removing the beads from scrap tires is disclosed and includes a pair of chain-and-sprocket driven spindles which are relatively expandable to engage the inner periphery of a tire and drive the tire in a somewhat rotary manner past a pair of cutting knives which sever the beads from the rest of the tire. After severing, the spindles are retracted toward one another to allow removal of the remaining tire casing and the two severed beads, and the placement of another scrap tire over the spindles. In a preferred form, one spindle pivots about the axis of its own driving sprocket so that the tension in the chain entrained about that driving sprocket and the driven sprocket coaxial with that spindle remains constant. A unique tire casing support near the cutting knives is also disclosed.

11 Claims, 3 Drawing Sheets

TIRE DEBEADER

SUMMARY OF THE INVENTION

The present invention relates generally to the art of reclaiming material from discarded vehicle tires and more particularly to a device for removing the steel wire containing bead portion of such tires to facilitate subsequent processing of the remaining tire portion.

Discarded vehicle tires are unsightly, provide a suitable breading location for mosquitos, are difficult to bury in conventional landfill locations, present air pollution problems when burned and generally present a disposal problem. Such tires are currently discarded in large quantities representing a significant waste of resources.

Reclamation of the materials in such tires is made more difficult by the steel wire typically located in the bead portion of the inner periphery of the tire where the tire contacts the vehicle rim. This strong steel wire is detrimental to tire reclamation equipment which is designed to shred, grind up, or otherwise recycle the tire material.

Attempts to remove this bead portion of the tire and the steel wire contained threrein have, until now, not met with much success. U.S. Pat. No. 2,298,685 discloses a machine designed to remove the bead portion from scrap tires. This device attempts to remove only the steel wire while saving the surrounding tire material for subsequent reprocessing and has not met with commerical success. This patent refers to earlier attempts where the casing was severed and the bead portion including the wire was discarded, but does not disclose how such severing was accomplished. The patented device does not separate the beads from a tire, but rather slits the tire casing to allow removal of the steel wire strands from the bead while leaving the rubber and fabric material.

Among the several objects of the present invention may be noted the provision of a technique for preprocessing scrap tires to reduce subsequent down-time and damage during a shredding operation; the provision of a machine for quickly and easily removing beads from tires; the provision of a tire debeading machine which is operable with a wide variety of tire sizes; and overall improvement in a scrap tire reclamation process. These as well as other objects and advantageous features of the present invention will be in part apparent and in part pointed out hereinafter.

In general, the present inventive device severs the bead ring or inner section of the tire containing several strands of very hard wire and rubber reinforcing from the tire casing. A tire is placed over two powered spools and an idler spool and then stretched by moving one powered spool away from the other two spools. When the two powered spools revolve in unison, the tire is driven to rotate past cutting knives which engage the tire and sever the bead rings. A wide range of tire sizes are accommodated without any adjustments being required to compensate for size variations. An adept operator can process several tires per minute on a machine made in accordance with the present invention.

Also in general and in one form of the invention, an arrangement for severing a bead from a tire has a pair of spindles or spools power drivable to rotate about respective spaced apart generally parallel axes at a common angular velocity and in the same rotative sense, and a pivot axis displaced from and generally parallel to the spindle axes. At least one spindle is pivotable about the pivot axis to change the separation between the spindle axes so that a tire may be positioned to encirle both spindles and then a spindle pivoted about the pivot axis to increase the separation between the spindles and force the spindles into firm driving engagement with the inner tire periphery. A cutting arrangement in the form of a pair of knives is movable into engagement with the opposed outer sidewall portions of the tire near the beads whereby, when the spindles are driven, the tire rotates about the spindles presenting the complete periphery of the sidewall portion of the tire to the cutting arrangement to sever the sidewalls and separate the beads from the remainder of the tire.

Still further in general, an arrangement for severing a bead from a tire in accordance with the present invention has a drive means for supporting a tire and for imparting motion thereto along with a pair of knives positioned to selectively engage opposed tire sidewall portions near respective beads, the knives being movable toward one another and into engagement with the opposed sidewall portions to simultaneously sever both sidewalls as the tire moves about the drive means and separate both beads from the remainder of the tire. A pair of knife supports are aligned with the respective knives and located close to the tire sidewall portions opposite the portions engaged by the knives for supporting the sidewall portions as they are severed by the knives.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
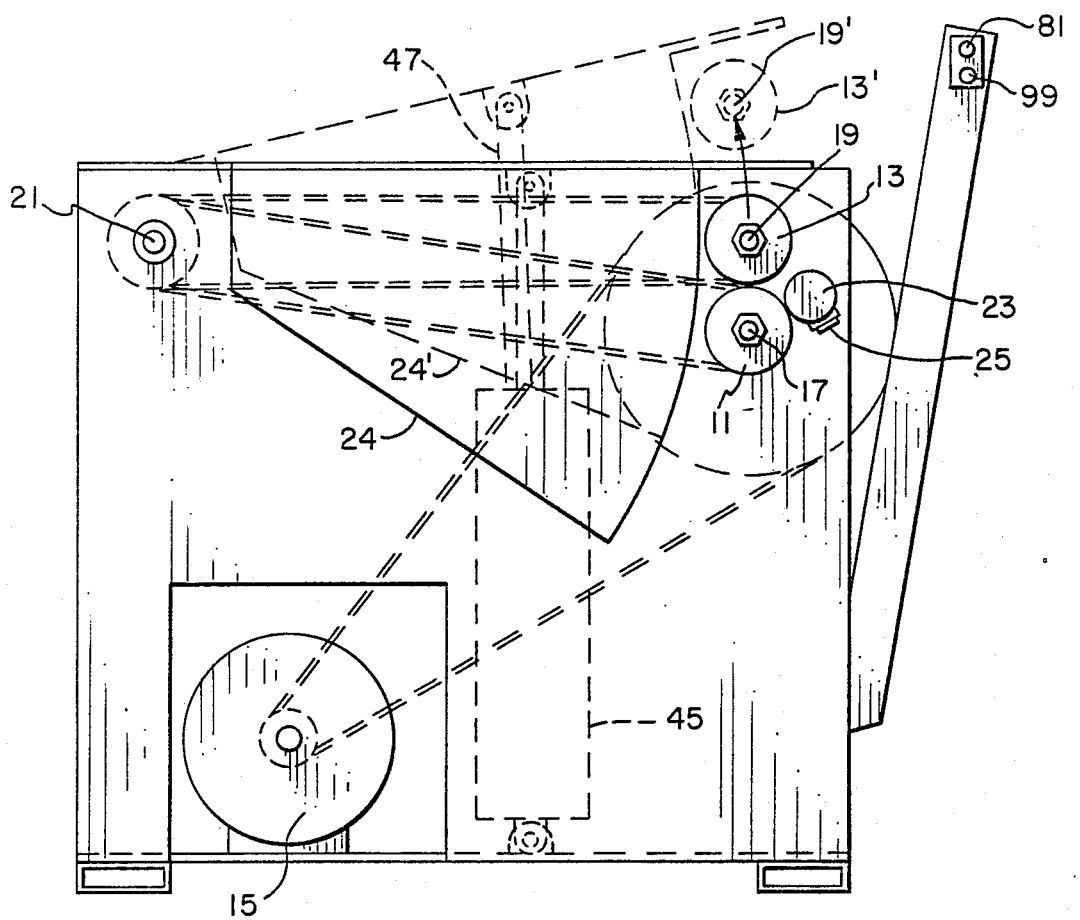
FIG. 1 is a side elevation view of a tire debeading machine incorporating the invention in one form.
Figure 2:
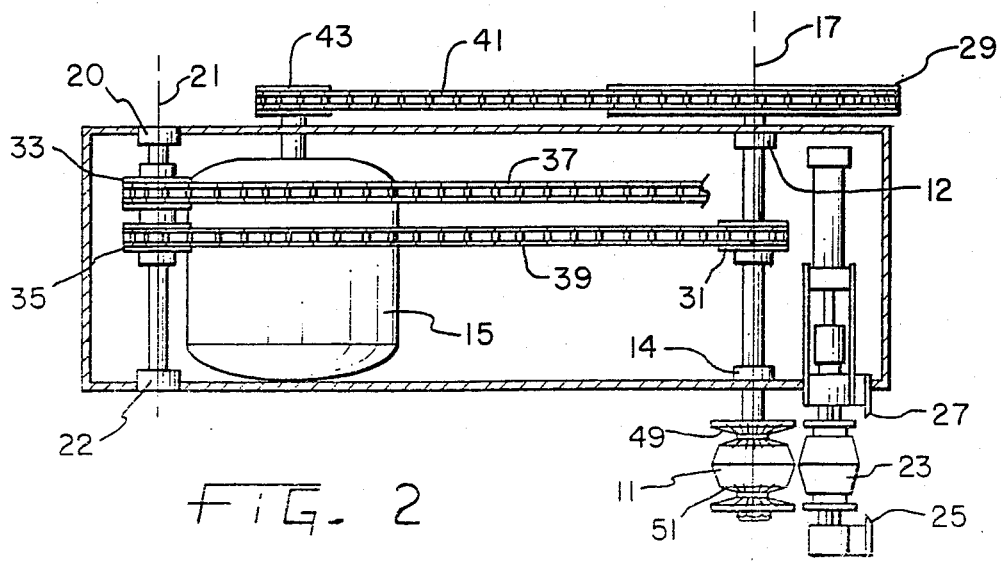
FIG. 2 is a top plan view of the machine of FIG. 1 with the upper spindle removed for clarity.

Referring first primarily to FIGS. 1 and 2, the machine drive means includes a pair of spindles 11 and 13 suitably journalled as at 12 and 14 and which are power drivable by an electric motor 15 to rotate about respective spaced apart generally parallel axes 17 and 19 at a common angular velocity and in the same rotative sense. A pivot axis 21 supported in bearings 20 and 22 is displaced from and generally parallel to the spindle axes 17 and 19. At least one spindle 13 is pivotable about the pivot axis 21 from the position illustrated in solid lines in FIG. 1 to that depicted in dotted lines and identified by correspondingly primed reference numerals to change the separation between the spindle axes. Thus, a tire may be positioned to encircle both spindles and then spindle 13 pivoted, clockwise as viewed, about the pivot axis 21 to increase the separation between the spindles and force the spindles into engagement with the inner tire periphery. An idler spindle 23, spaced from and parallel to each of the drivable spindle axes, is located out of the plane defined by the drivable spindle axes and forms a pair of knife supports for firmly supporting the tire casing against the thrust of the cutting knives 25 and 27 as will be more apparent in the subsequent discussion of FIG. 3.

The drive arrangement includes, in addition to the drive motor 15, a chain and sprocket system coupling the drive motor to each spindle. The chain and sprocket system includes a first sprocket connected to the shaft of spindle 13 and not visible in FIG. 1, and second sprocket 31 fixed to the shaft of spindle 11 with each sprocket fixed to and rotatable with a corresponding spindle. Third and fourth sprockets 33 and 35 are fixed together for common rotation about the pivot axis 21. A fifth sprocket 43 is coupled to the drive motor 15. A first chain 37 is entrained about the first and third sprockets, a second chain 39 is entrained about the second and fourth sprockets and a third chain 41 supplies power from the motor to the fourth sprocket 35 by way of sprocket 29, sprocket 31 and chain 39. A sixth sprocket 29 is fixed to the second sprocket spindle and the third chain is entrained about the fifth and sixth sprockets 43 and 29 respectively.

A scrap tire is placed over the spindles 11, 13 and 23 and air cylinder 45 energized to raise spindle 13 to the position indicated by 13'. Air cylinder 45, when actuated to extend its piston rod 47, pivots the spindle 13 counterclockwise as viewed in FIG. 1 and the inner tire periphery is deformed from its normal generally circular configuration as the spindles are forced into engagement therewith. A pie-shaped guard or shield 24 pivots with the spindle 13. Thus, the drive means deforms and slightly stretches the tire preparatory to and when imparting motion. It will be noted that both spindles 11 and 13 are provided with knurled or roughened surfaces as at 49 and 51 to firmly engage and drive the tire in a slip free manner.

Figure 3:
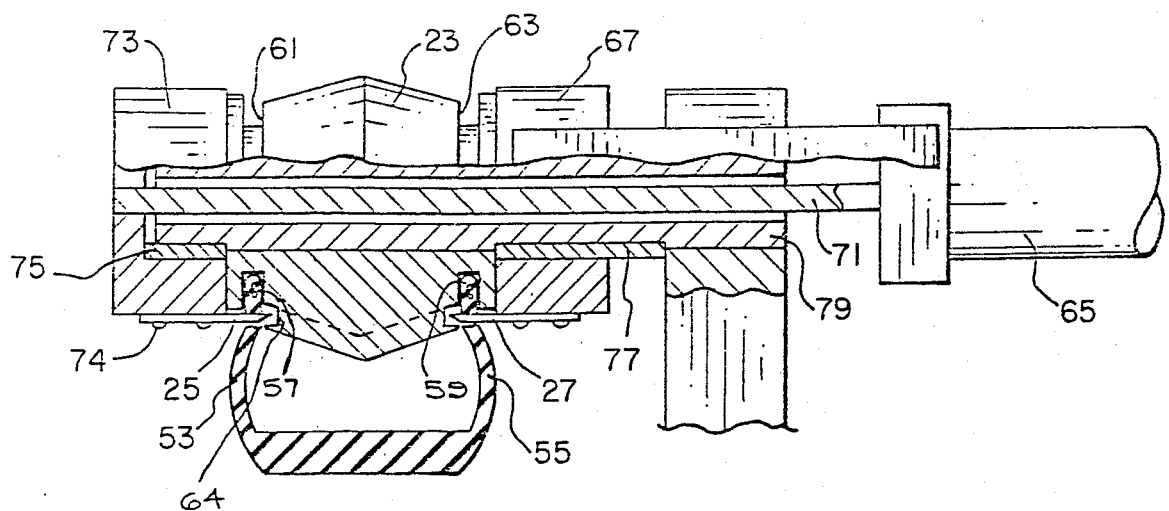
FIG. 3 is a detailed plan view partially in cross-section, of the cutting arrangement and idler spindle of FIGS. 1 and 2.
Figure 4:
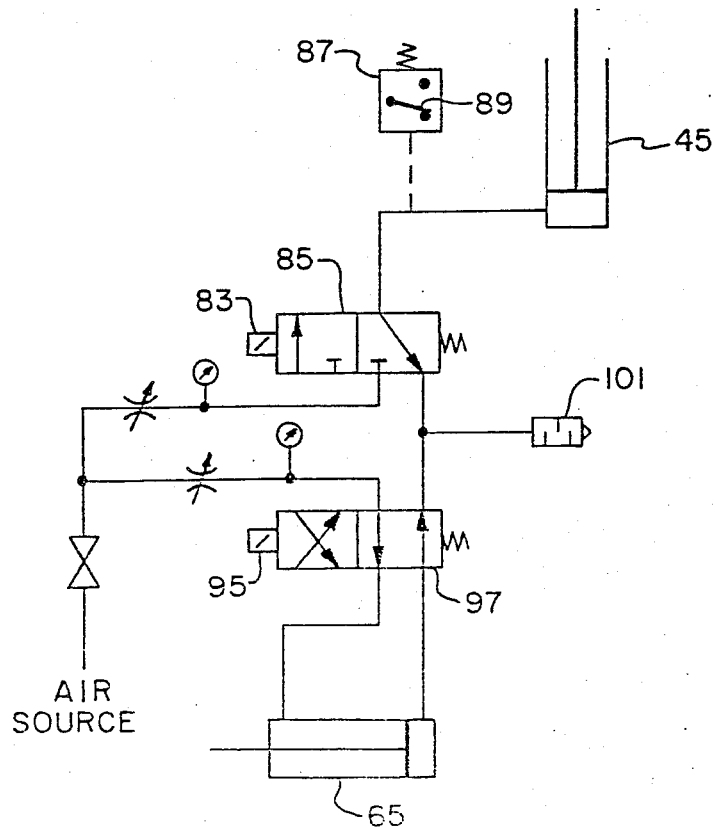
FIG. 4 is a pneumatic schematic diagram of the control system for the machine of FIG. 1.
Figure 5:
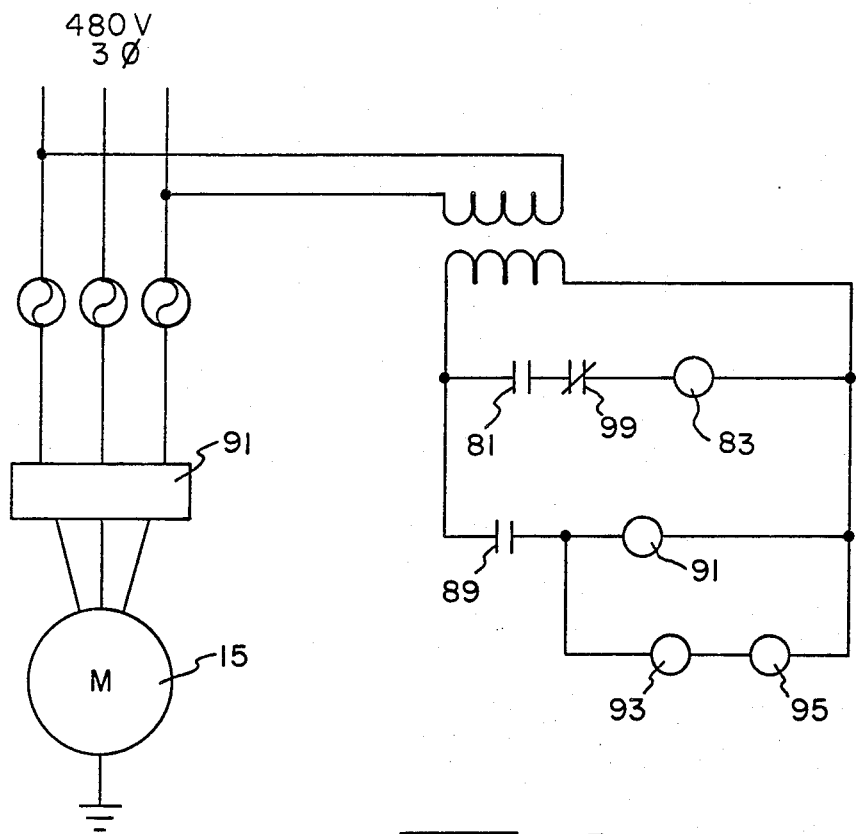
FIG. 5 is an electrical schematic diagram of the control circuitry used in conjunction with the control system of FIG. 4.

The idler spindle 23 and its associated structure depicted near the lower right hand corner of FIG. 2 is better seen in FIG. 3. In FIG. 3, a pair of knives 25 and 27 are positioned to selectively engage opposed tire sidewall portions 53 and 55 near respective beads 57 and 59. The knives are simple blades fixed to the knife supports such as 73 by screws such as 74 so as to be easily replaced when dull. The knives are movable toward one another and into engagement with the opposed sidewall portions to simultaneously sever both sidewalls as the tire moves about the drive means and relative to the spindle 23 to separate both beads from the remainder of the tire. A pair of knife supports in the form of spindle faces 61 and 63 are aligned with the respective knives and located close to the tire sidewall portions opposite the portions engaged by the knives for supporting the sidewall portions as they are severed by the knives. It will be noted that the spindle 23 may be fixed or nonrotatable in which case the tire slides along the faces 61 and 63, or the spindle may be rotatable about its axis so that the faces 61 and 63 rotatively engage their respective tire beads. The optional anvil 64, shown only in FIG. 3, forms a stationary cutting means support aligned with the cutting means and located close to the tire sidewall portion opposite the portion engaged by the cutting means for supporting the sidewall portion as it is severed by the cutting means. The closure of the knives toward the tire is controlled by air cylinder 65. This air cylinder has its body fixed to knife support 67 while the piston rod 71 is fixed to knife support 73. The knife supports are keyed as at 75 and 77 to the fixed shaft 79 and the air cylinder body 65 is free to move back and forth. Spindle 23 may be fixed to the shaft 79 or free to rotate about the shaft, but in either case, fixed in axial position. Thus when the air cylinder is actuated, the knives close on one another and engage the tire. The control of this cylinder and the overall action of the machine will be better understood from the following discussion of the control circuitry of FIGS. 4 and 5.

After a tire is positioned spanning the spindles or spools 11, 13 and 23, the normally open contacts of the "on" button 81 are closed and latched in the closed position. This energizes the solenoid 83 and enables a supply of air through valve 85 to the cylinder 45 stretching the tire. A pressure switch 87 senses when the tire is engaged and closes contacts 89 enabling relay 91 to supply power to the drive motor 15 commencing tire rotation. The closing of contacts 89 also starts timer 93 which, after an appropriate delay to allow the system to come up to speed, energizes solenoid 95 opening valve 97 to supply air to the cylinder 65 and close the knives toward one another. When the operator sees that the beads have been severed from the tire, he depresses "off" switch 99 opening those normally closed contacts (this also opens the latched contacts 81) and disables solenoid 83 venting air to the atmosphere via the muffler 101. The pressure switch contacts 89 open disabling the motor as well as returning valve 95 to its initial position to in turn return the knives to their separated position.

From the foregoing, it is now apparent that a novel arrangement for severing tire beads from scrap tires has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. An arrangement for severing a bead from a tire comprising:

a pair of spindles power drivable to rotate about respective spaced apart generally parallel axes at a common angular velocity and in the same rotative sense;

a pivot axis displaced from and generally parallel to the spindle axes, at least one spindle being pivotable about the pivot axis to change the separation between the spindle axes whereby a tire may be positioned to encircle both spindles and then a spindle pivoted about the pivot axis to increase the separation between the spindles and force the spindles into engagement with the inner tire periphery; and cutting means movable into engagement with a sidewall portion of the tire near the bead whereby, when the spindles are driven, the tire rotates about the spindles presenting the complete periphery of the sidewall portion of the tire to the cutting means to sever the sidewall and separate the bead from the remainder of the tire.

2. The arrangement of claim 1 wherein the cutting means comprises a pair of knives positioned to selectively engage opposed tire sidewall portions near respective beads, the knives being movable toward one another and into engagement with the opposed sidewall portions to simultaneously sever both sidewalls as the tire rotates about the spindles and separate both beads from the remainder of the tire.

3. The arrangement of claim 2 further comprising a pair of knife supports aligned with the respective knives and located close to the tire sidewall portions opposite the portions engaged by the knives for supporting the sidewall portions as they are severed by the knives.

4. The arrangement of claim 2 further comprising an idler spindle freely rotatable about an axis spaced from and parallel to each of the drivable spindle axes, the idler axis being located out of the plane defined by the drivable spindle axes, the idler spindle forming a pair of knife supports aligned with the respective knives and located close to the tire sidewall portions opposite the portions engaged by the knives for supporting the sidewall portions as they are severed by the knives.

5. The arrangement of claim 1 further comprising a stationary cutting means support aligned with the cutting means and located close to the tire sidewall portion opposite the portion engaged by the cutting means for supporting the sidewall portion as it is severed by the cutting means.

6. An arrangement for severing a bead from a tire comprising:
   drive means for supporting a tire and for imparting motion thereto;
   a pair of knives positioned to selectively engage opposed tire sidewall portions near respective beads, the knives being movable toward one another and into engagement with the opposed sidewall portions to simultaneously sever both sidewalls as the tire moves about the drive means and separate both beads from the remainder of the tire; and
   a pair of knife supports aligned with the respective knives and located close to the tire sidewall portions opposite the portions engaged by the knives for supporting the sidewall portions as they are severed by the knives;
   said drive means comprises a pair of spindles power drivable to rotate about respective spaced apart generally parallel axes at a common angular velocity and in the same rotative sense;
   a pivot axis displaced from and generally parallel to the spindle axes, at least one spindle being pivotable about the pivot axis to change the separation between the spindle axes whereby a tire may be positioned to encircle both spindles and then a spindle pivoted about the pivot axis to increase the separation between the spindles and force the spindles into engagement with the inner tire periphery; and
   an idler spindle spaced from and parallel to each of the drivable spindle axes, the idler spindle being located out the plane defined by the drivable spindle axis and forming the pair of knife supports.

7. The arrangement of claim 6 wherein the drive means further comprises a drive motor and a chain and sprocket system coupling the drive motor to each spindle.

8. The arrangement of claim 7 wherein the chain and sprocket system includes first and second sprockets each fixed to and rotatable with a corresponding spindle, third and fourth sprockets fixed together for common rotation about the pivot axis, a fifth sprocket coupled to the drive motor, a first chain entrained about the first and third sprockets, a second chain entrained about the second and fourth sprockets and a third chain for supplying power from the motor to the fourth sprocket.

9. The arrangement of claim 8 further comprising a sixth sprocket fixed to the second sprocket spindle, the third chain being entrained about the fifth and sixth sprockets.

10. The arrangement of claim 6 wherein the inner tire periphery is deformed from its normal generally circular configuration when the spindles are forced into engagement therewith.

11. The arrangement of claim 6 wherein the drive means deforms and slightly stretches the tire when imparting motion thereto.

* * * * *